United States Patent
Ishibashi et al.

(10) Patent No.: US 7,064,473 B2
(45) Date of Patent: Jun. 20, 2006

(54) ACTUATOR FILM MATERIAL, ACTUATOR FILM AND ACTUATOR USING THE SAME

(75) Inventors: Masayoshi Ishibashi, Tokyo (JP); Midori Kato, Kawagoe (JP)

(73) Assignee: Hitachi, Ltd., Tokyo (JP)

( * ) Notice: Subject to any disclaimer, the term of this patent is extended or adjusted under 35 U.S.C. 154(b) by 130 days.

(21) Appl. No.: 10/789,979

(22) Filed: Mar. 2, 2004

(65) Prior Publication Data
US 2005/0122007 A1    Jun. 9, 2005

(30) Foreign Application Priority Data
Dec. 8, 2003    (JP)    ............... 2003-408517

(51) Int. Cl.
*H01L 41/08*    (2006.01)

(52) U.S. Cl. ............ 310/800; 310/330

(58) Field of Classification Search ........... 310/800, 310/328, 330–332, 311, 338; 427/443, 308; 414/1, 7; 604/177, 171; 74/490.02; 204/415–418; H01L 41/08; B25J 15/00
See application file for complete search history.

(56) References Cited

U.S. PATENT DOCUMENTS 5,481,152 A * 1/1996 Buschulte ............ 310/328
5,556,700 A * 9/1996 Kaneto et al. ............ 428/332
6,109,852 A * 8/2000 Shahinpoor et al. ............ 414/1

FOREIGN PATENT DOCUMENTS

JP    02020586    1/1990
JP    06006991    1/1994

OTHER PUBLICATIONS

Basic Study on Human Robot Interaction For Motion Support By Muscle Suit, Kobayashi et al, Proceedings of the 2002 IEEE, pp. 17-22.

* cited by examiner

*Primary Examiner*—Darren Schuberg
*Assistant Examiner*—Karen B Addison
(74) *Attorney, Agent, or Firm*—Antonelli, Terry, Stout and Kraus, LLP.

(57) ABSTRACT

Provided is an actuator manufactured using a material obtained by mixing a film material featuring stable motion and high speed of response and used for ion conductive polymer actuators with conductive fine particles. According to the present invention, an actuator which is light in weight, produces low operating noise, and can be used safely and stably, and at the same time, produces expansion/contraction motion, and has speed of response comparable to that of a natural muscle can be obtained.

13 Claims, 11 Drawing Sheets

(d)

ACTUATOR FILM MATERIAL, ACTUATOR FILM AND ACTUATOR USING THE SAME

FIELD OF THE INVENTION

The present invention relates to an actuator film material and actuator film which expand or contract when a voltage is applied thereto, an actuator using the film and manufacturing process of the actuator.

BACKGROUND OF THE INVENTION

The Japanese society in the early 21st must be improved so that people having troubles with the functions of their hands and feet owing to aging, accident or disease can participate in the society as those having no disabilities. The wearable power assist technology exists for those who cannot move their hands and feet freely and aims at compensation for their poor functions by wearing. Specific examples of the wearable power assist technology well known now include electric wheelchairs and electric prosthetic limbs. In addition, new technology such as powered suit capable of conveniently enhancing the mobility by wearing it is proposed recently (H. Kobayashi and T. Shiiba: Basic Study on Human Robot Interaction for Motion Support by Muscle Suite: Proceedings of 2002 IEEE, Int., Workshop on Robot and Human Interactive Communication, pp. 17–22).

For such technology, a sensor for detecting an intention to move hands and feet, a sensor for detecting the stroke of motion and an actuator for assisting the motion of hands and feet are bare essentials. In particular, an actuator must be at least equal to natural muscle in properties such as speed of response, generating stress and displacement and moreover, it must be light, less noisy and safe. Actuators having such properties are required not only in the wearable power assist technology but also for apparatuses which come in direct contact with humans or human living environments, for example, pet type robots or medical electric apparatuses.

As an actuator for powered suit, pneumatic rubber artificial muscles or motors have been employed recently. Such actuators have excellent properties, but they are heavy and tend to emit a high operating noise.

In addition to such conventional actuators, there are actuators using a soft material such as organic polymer material. Among the actuators, a conductive polymer actuator using a conductive polymer such as polyaniline or polypyrrole as a material (Japanese Patent Application Laid-Open No. 20586/1990), and an ion conductive polymer actuator using an ion exchange resin as a material (Japanese Patent Application Laid-Open No. 6991/1994) have properties suited as an actuator for wearable power assist technology, because a raw material used for them are light, does not emit a high operating noise, can be driven at a voltage as low as several volts, and is soft and safe.

SUMMARY OF THE INVENTION

When properties of these actuators are compared with those of a natural muscle, conductive polymer actuators exhibit expansion/contraction motion similar to a muscle and stress generated by them are several to several tens times high, however, their speed of response is low and severe deterioration in an actuator film occurs. The ion conductive polymer actuators have merits in high speed of response and stable operation for long hours, however, the stress generated by them is one tenth to one hundredth of a natural muscle and its bending motion prevents the use of it as an actuator for wearable power assist technology as is.

An object of the present invention is to provide an actuator film material, actuator film and actuator using the film which is light in weight, emits low operating noise, and can be used safely and stably, and at the same time, exhibits expansion/contraction motion, and is comparable to natural muscle in performance such as speed of response.

With a view toward attaining the above-described object, a material obtained by mixing conductive fine particles with an ion conductive polymer material which operates stably and has high speed of response is used as a material for an actuator film. By mixing the conductive fine particles, flexible electrodes having a large surface area are formed on the surface and inside of the film material, and the electron conductivity of the film which was conventionally low can be heightened. Such a mixed material can produce expansion/contraction motion and can be used for similar purposes to the conventional expansion/contraction type conductive polymers.

According to the present invention, an actuator which is light in weight, emits a low operating noise, and can be used safely and stably and at the same time, produces expansion/contraction motion facilitating copying of the motion of a natural muscle and has a speed of response comparable to that of natural muscle can be provided.

DESCRIPTION OF THE PREFERRED EMGBODIMENTS

Examples of the present invention will next be described based on accompanying drawings.

EXAMPLE 1

Figure 1A:
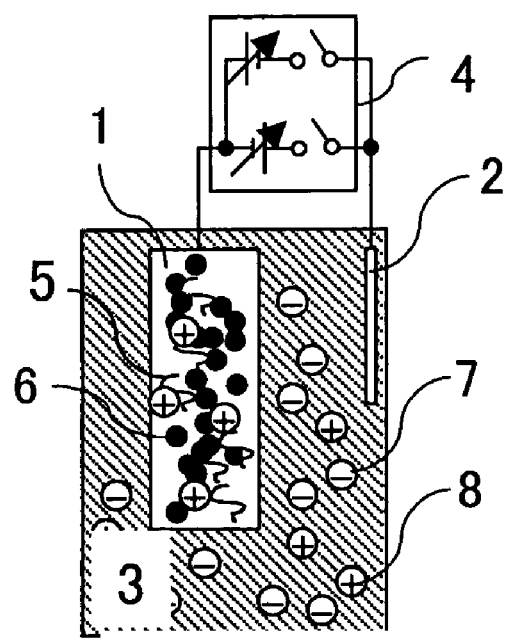
FIG. 1A illustrates the state in which the actuator film 1 of Example 1 and counter electrode 2 are electrically disconnected.
Figure 1B:
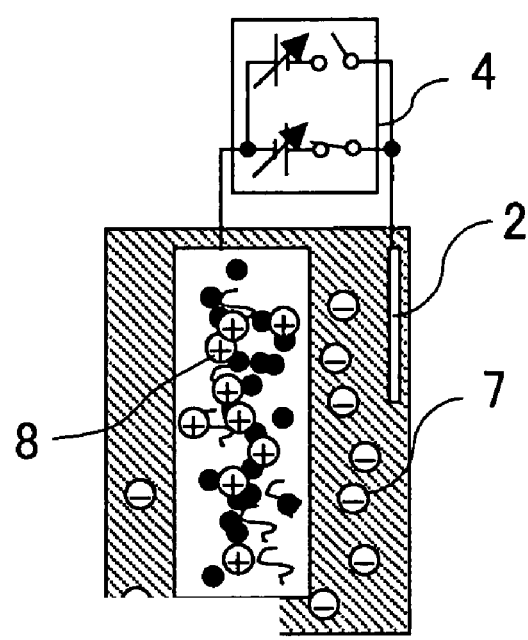
FIG. 1B illustrates the state in which a lower switch is turned on to apply a voltage in order to adjust the potential of the actuator film 1 of Example 1 to be lower than that of the counter electrode 2.
Figure 1C:
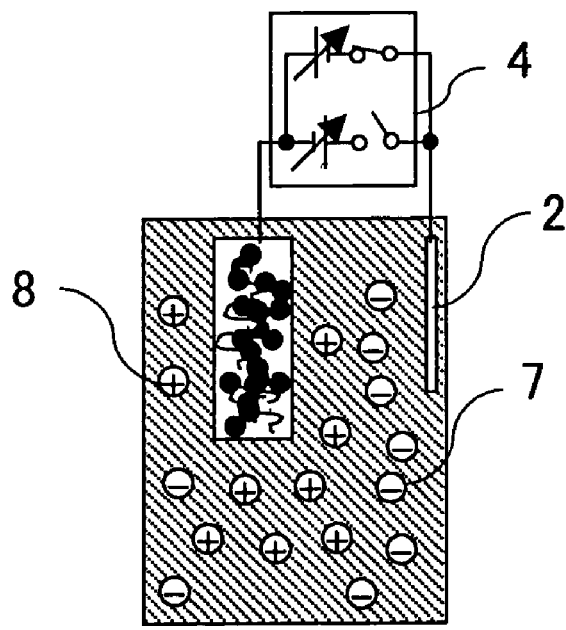
FIG. 1C illustrates the state in which an upper switch is turned on to apply a voltage in order to adjust the potential of the actuator film 1 of Example 1 to be higher than that of the counter electrode 2.

In Example 1, the concept of the essential motion of the actuator of the present invention and its manufacturing process will be described. First, the outline of the essential motion will be described referring to FIG. 1A to FIG. 1C. FIG. 1A to FIG. 1C are each a schematic view for explaining a constitution necessary for operating the actuator of the present invention, and expansion and contraction motion of an actuator film, which will generate a driving force of the actuator, when a voltage is applied to the actuator film.

The actuator of Example 1 is composed of an actuator film 1, a counter electrode disposed opposite thereto, an electrolyte solution 3 in which the actuator film 1 and counter electrode 2 are to be dipped, and a voltage supply 4 for applying a voltage to the actuator film 1 and counter electrode 2. To the voltage supply 4, a circuit having a power supply and a switch connected in series is connected in parallel and the power supply of the circuit connected in parallel is imparted with reverse polarity. The actuator film 1 is obtained by dispersing conductive fine particles 6 in a resin 5. The resin 5 is an ion conductive polymer material having a capacity of capturing negative electrolyte ions 7 or positive electrolyte ions 8 which have been ionized in the electrolyte solution 3.

In Example 1, a perfluorosulfonic acid copolymer was used as the resin 5 for the actuator film 1. The perfluorosulfonic acid copolymer has a sulfone group at the end of its side chain and has a capacity of capturing positive electrolyte ions in an electrolyte solution. As the conductive fine particles 6, carbon fine particles having a diameter of about 50 nanometers were used. The carbon fine particles 6 were mixed with the perfluorosulfonic acid copolymer as the resin 5 at a weight ratio of 0.3:5. As the counter electrode 2, platinum was employed. As the electrolyte solution 3, a 0.15N aqueous solution of sodium chloride was employed. In the electrolyte solution 3, sodium chloride serving as an electrolyte is ionized into chloride ions 7 which are negative electrolyte ions and sodium ions 8 which are positive electrolyte ions.

FIG. 1A illustrates the state in which two switches of the voltage supply 4 are turned off, in other words, the actuator film 1 and counter electrode 2 are electrically disconnected. Since the resin 5 used for the actuator film 1 has a capacity of capturing sodium ions 8 which are positive electrolyte ions, a certain amount of sodium ions has been captured in the actuator film 1 without application of a voltage. Even though a voltage is not applied, the actuator film 1 is swollen compared with that set in pure water free of electrolyte ions.

FIG. 1B illustrates the state in which a lower switch is turned on to apply a voltage so that the potential of the actuator film 1 will become positive relative to the counter electrode 2. The actuator film 1 has conductive fine particles 6 dispersed therein so that an electrode having a considerably large surface area, flexibility and high electron conductivity is formed inside and on the surface of the actuator film 1. It is therefore possible to make the potential of almost the whole area of the actuator film 1 substantially equal by bringing the electrode into contact with a portion of the end of the actuator film 1. Adhesion of gold or platinum to a contact portion of the electrode with the end of the actuator film 1 by plating or deposition is more preferred because it decreases the contact resistance.

When a voltage of, for example, 1.2V is applied between the actuator film 1 and counter electrode 2, more sodium ions, which are positive electrolyte ions 8 in the electrolyte solution, than those in FIG. 1A are introduced in the actuator, which swells the actuator film 1 by $\Delta L$ compared with the state of FIG. 1A. Assuming that the whole length of the actuator film 1 prior to the voltage application is L, the expansion ratio $\Delta L/L$ is about 1.5%.

FIG. 1C is the state in which an upper switch is turned on to apply a voltage so that the potential of the actuator film 1 will become positive relative to the counter electrode 2. When a voltage of, for example, 1.2V is applied between the actuator film 1 and counter electrode 2, sodium ions 8, which are positive electrolyte ions captured in the actuator film 1, are released outside of the actuator film 1 by an electrostatic force. This causes contraction by $\Delta L$ compared with the state of FIG. 1A. Assuming that the whole length of the actuator film 1 prior to the voltage application is L, a contraction ratio $\Delta L/L$ is about 0.5%.

Expansion/contraction motion of the actuator film 1 of the present invention can be induced by changing a voltage applied thereto. In practice, even if the expansion motion of the actuator film 1 is induced by applying a voltage thereto to make the potential of the actuator film 1 negative relative to the counter electrode 2, this expansion of the film does not act to push an article at the end of the film. The actuator made of the actuator film 1 of the present invention moves an article by attracting it as a natural muscle does. Described specifically, the actuator converts the state from FIG. 1B (or FIG. 1A) to FIG. 1C to attract an article existing at the end of the actuator film 1. The attracting force can be released by restoring the state of FIG. 1B or FIG. 1A. The actuator film can attract an article at the end of the actuator film 1 even by controlling the state from FIG. 1A to FIG. 1C. The latter case is inferior to the former case in a displacement level. It is however advantageous, because a change in the polarity of a voltage applied between the actuator film 1 and counter electrode 2 is not needed.

The actuator film of Example 1 is made of a material obtained by mixing a perfluorosulfonic acid copolymer having a specific gravity of about 2 with carbon fine particles having a specific gravity of about 2.3. Use of this material can decrease the weight of an actuator compared with PZT (lead zirconate titanate) having a specific gravity of about 8 frequently employed for a piezolinear actuator or iron having a specific gravity of about 7 used as a material for a motor, when an actuator of the same capacity is manufactured. The actuator of the present invention shows responsiveness of about 30 mili-sec or less. It works stably even when the expansion/contraction motion (repetition of the states of FIG. 1B and FIG. 1C) is produced 10,000,000 times or more.

In Example 1, a perfluorosulfonic acid copolymer is employed as the resin 5 used for the actuator film 1. Alternatively, a resin having, at an end of the side chain thereof, a carboxyl group instead of a sulfone group may be used. Polyfluorocarbon serving as the backbone of the copolymer may be replaced with polystyrene. Examples of the conductive fine particles 6 used for the actuator film 1 include, in addition to carbon fine particles, carbon nanotubes, platinum fine particles and gold fine particles. In Table 1, kind and size of fine particles which can be used for the actuator film of the present invention when a perfluorosulfonic acid copolymer is employed as the resin are shown.

TABLE 1

| Fine particulate material | Size |
|---|---|
| Carbon | 5000 nm or less (desirably, 100 nm or less) |
| Platinum | 100 nm or less (desirably, 50 nm or less) |
| Gold | 100 nm or less (desirably, 50 nm or less) |

The actuator can operate when any one of carbon fine particles of 5000 nm or less, platinum fine particles of 100 nm or less, and gold fine particles of 100 nm or less are employed, but the particle size is preferably 100 nm or less, 50 nm or less and 50 nm or less, respectively for attaining a great expansion or contraction ratio.

For expansion/contraction motion of the actuator film of the present invention, a mixing ratio of the resin and fine particles permitting the resulting fine-particle-containing resin film to have an electric conductivity of about 0.1 S/cm or greater is effective. The relationship between the electric conductivity of the fine-particle-containing resin film and a mixing ratio of the resin and fine particles depends on the kind or size of the resin or fine particles. Table 2 shows the relationship, when a perfluorosulfonic acid copolymer and carbon fine particles are used as the resin 5 and conductive fine particles, respectively, between the size of the fine particles and a mixing ratio (by weight) of the fine particles to the resin for enabling the expansion/contraction motion of an actuator.

TABLE 2

| Fine particle size | 5000 nm | 50 nm |
|---|---|---|
| Mixing ratio by weight | 1.0 or greater | 0.1 or greater |

Any material can be used for the counter electrode 2 insofar as it is a material having conductivity and has a surface resistant to deterioration caused by electrochemical reaction. In Example 1, platinum was employed, but it can be replaced with gold or carbon. The counter electrode 2 formed to surround the actuator film 1 enables an increase in an expansion or contraction ratio and a high-speed operation. As the electrolyte solution 3, an aqueous solution of a perchlorate, fluoborate, fluorophosphate, bromide, hydroxide, acetate, sulfate, nitrate or borate can be used as well as an aqueous solution of a metal chloride such as sodium chloride or potassium chloride. As cations, not only metals but also molecular cations such as alkyl ammonium salts can be used.

In the actuator film of the present invention, its displacement level and speed of response depend on the kind of an electrolyte and voltage applied thereto.

Concerning the kind of an electrolyte, the greater the size of an electrolyte ion in an electrolyte solution, the higher the displacement level. Described specifically, when an alkali metal is employed as a positive electrolyte ion, a higher displacement level is attained by a sodium ion than a lithium ion, a potassium ion than a sodium ion and a rubidium ion than a potassium ion. Moreover, a displacement level is higher when an ion having a greater molecular size such as alkyl ammonium ion is used compared with the use of a monoatomic ion such as alkali metal ion.

The greater the applied voltage, the higher the speed of response. A rise in an applied voltage however causes electrolysis of the electrolyte solution, which inevitably generates gas on the surface of the counter electrode 2 or the actuator film. It is therefore necessary to select a proper voltage.

A preparation process of the actuator film of Example 1 will next be described referring to FIG. 2A to FIG. 2D. FIG. 2A to FIG. 2D are each a schematic view illustrating each step of the preparation process of the actuator film of Example 1.

Figure 2A:
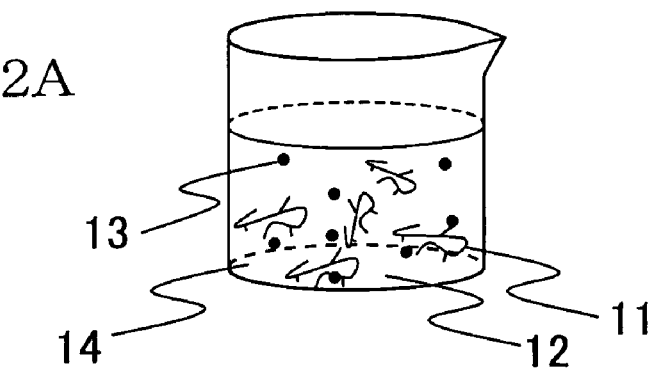
FIG. 2A is a schematic view illustrating, of preparation steps of the actuator film of Example 1, a step of preparing a fine-particle-containing solution 14.

Conductive fine particles 13 are mixed at a desired ratio in a solution (resin-dispersed solution) obtained by dispersing, in a solvent 12, a resin 11 which is an ion conductive polymer material having a capacity of capturing negative electrolyte ions or positive electrolyte ions ionized in an electrolyte solution, followed by stirring to prepare a fine-particle-containing solution 14 (FIG. 2A). The resin-dispersed solution employed in Example 1 was a solution obtained by dispersing 5% of a perfluorosulfonic acid copolymer in a 1:1 mixed solvent of water and alcohol or a mixed solution thereof with dimethylformamide. Carbon fine particles having a diameter of about 50 nm were employed as the conductive fine particles 13.

Figure 2B:
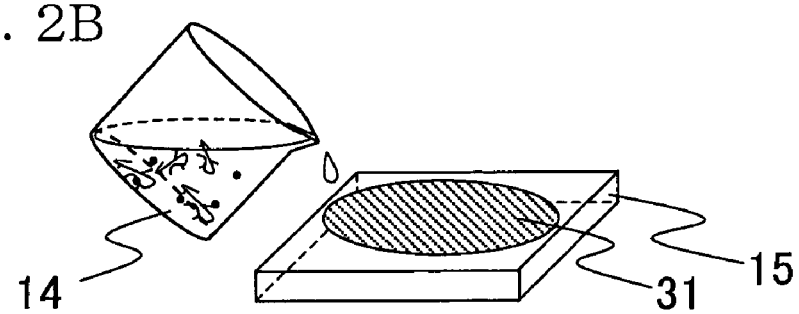
FIG. 2B is a schematic view illustrating, among the preparation steps of the actuator film of Example 1, a step of preparing a mixed film 31 of an ion conductive polymer and conductive fine particles on a substrate.

The fine-particle-containing solution 14 thus prepared was applied to a hydrophilic substrate 15, followed by drying at a temperature as high as 70° C., whereby a mixed film 31 of the ion conductive polymer and conductive fine particles was prepared (FIG. 2B). In Example 1, a glass substrate was used as the substrate 15. In Example 1, the drying temperature was set at 70° C., but a drying temperature range may be from room temperature to 180° C. For drying, any one of casting method, spin casting method, and spray coating method can be used.

Figure 2C:
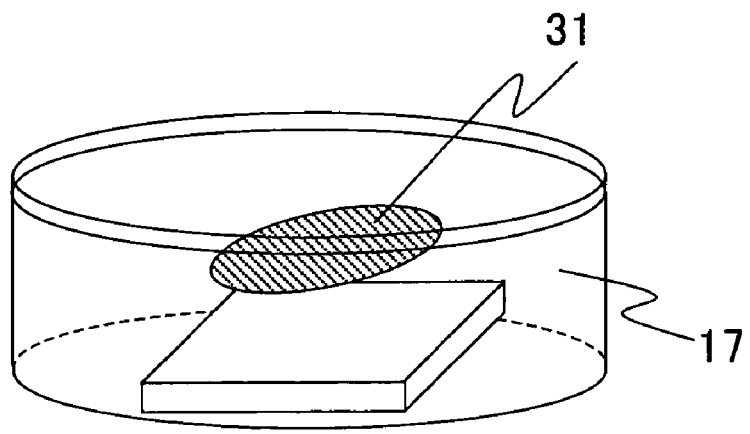
FIG. 2C is a schematic view illustrating, among the preparation steps of the actuator film of Example 1, a step of peeling the mixed film 31 of an ion conductive polymer and conductive fine particles from the substrate.

In an aqueous solution 17 having an electrolyte dissolved therein, the dried mixed film 31 of the ion conductive polymer and conductive fine particles was dipped while having been applied to the substrate 15. The mixed film 31 of the ion conductive polymer and conductive fine particles then swelled and peeled from the substrate 15 (FIG. 2C). Here, instead of the aqueous solution 17 having an electrolyte dissolved therein, pure water can be used.

Figure 2D:
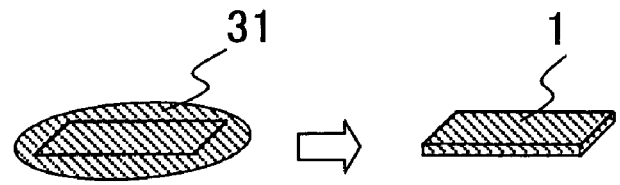
FIG. 2D is a schematic view illustrating, among the preparation steps of the actuator film of Example 1, a step of forming the peeled mixed film 31 of an ion conductive polymer and conductive fine particles into a desired shape.

In the final step, the mixed film 31 of the ion conductive polymer and conductive fine particles peeled from the substrate was skimmed and from the film thus obtained, an unnecessary portion was mechanically cut off, whereby an actuator film 1 in the desired shape was completed (FIG. 2D).

Figure 3:
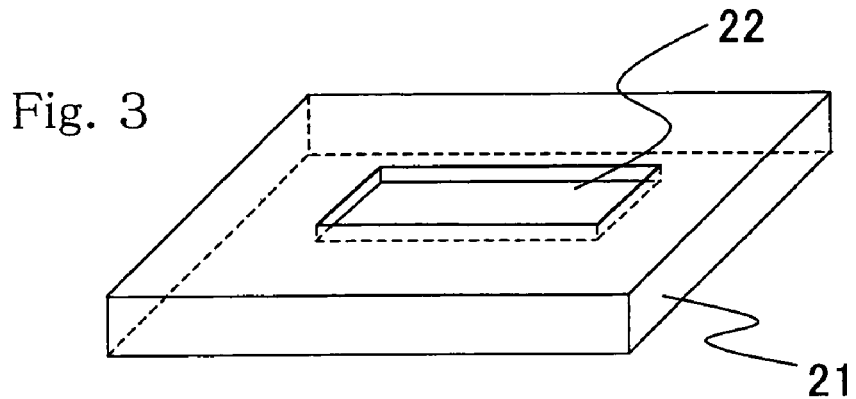
FIG. 3 illustrates an example of a substrate used for the preparation of an actuator film by casting the fine-particle-containing solution 14 in a mold disposed on a substrate, followed by drying and peeling.

In FIG. 2D, the film was shaped by mechanical cutting, which can be replaced with dry etching with an oxygen gas. The final shape of the actuator film 1 is obtained after the film peels off from the substrate 15, but shaping may be carried out prior to peeling. Moreover, an actuator having a desired shape can be prepared by forming, in a substrate 21, a mold 22 of the actuator film 1 having the corresponding shape in advance as illustrated in FIG. 3, casting the fine-particle-containing solution 14 in the mold, drying the solution and then peeling the resulting film.

According to Example 1, the actuator film 1 of the present invention produces stable expansion/contraction motion when a voltage is applied and a film of a desired shape can be prepared easily.

EXAMPLE 2

In Example 2, various modes of the actuator film 1 described in Example 1 will be explained referring to FIG. 4 to FIG. 12D.

Figure 4:
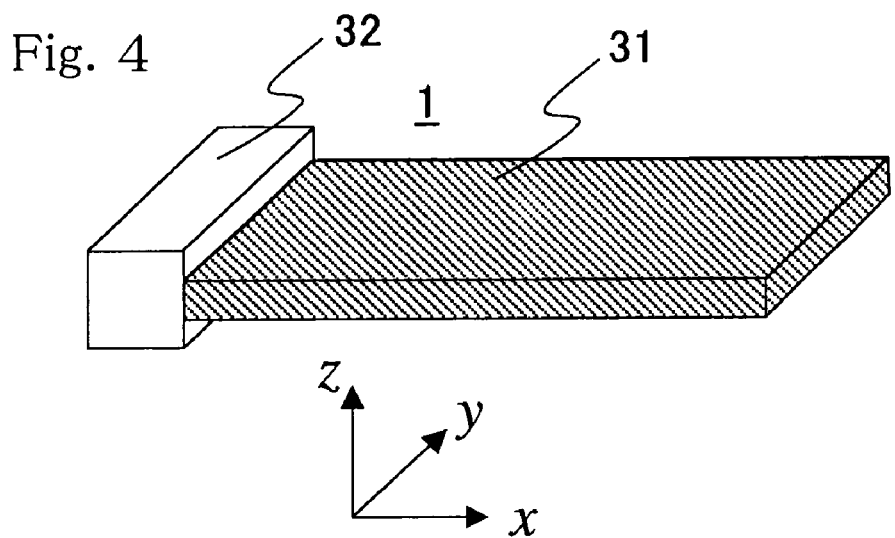
FIG. 4 is a perspective view illustrating an actuator film having a simplest structure as described in Example 1.

FIG. 4 is a perspective view illustrating the simplest structure of the actuator film 1 described in Example 1. As illustrated in the diagram, large expansion/contraction motion is caused in the direction of an x axis on a xyz rectangular coordinate system. This actuator film 1 is characterized by its constitution having a mixed film 31 of an ion conductive polymer having a capacity of capturing negative electrolyte ions or positive electrolyte ions ionized in an electrolyte solution and conductive fine particles, and a terminal electrode 32 for connecting it the actuator film to a power supply. It has thus a simple structure and therefore can be manufactured easily only by attaching the terminal electrode 32 to the actuator film obtained in FIG. 2D. In FIG. 4, the film is connected to the power supply at only the terminal electrode 32 existing at one end of the film. Alternatively, this terminal electrode 32 may of course be disposed on both ends of the film.

In the example of FIG. 4, a perfluorosulfonic acid copolymer and carbon fine particles having a diameter of about 50 nm were used as the ion conductive polymer having a capacity of capturing negative electrolyte ions or positive electrolyte ions ionized in an electrolyte solution and the conductive fine particles, respectively.

Use of carbon fine particles as the conductive fine particles to be mixed with the ion conductive polymer decreases the weight of the actuator and lowers the cost of raw materials. In spite of such advantages, the displacement level of expansion/contraction becomes smaller at a site farther from the connection point with the power supply. Such a decrease in the displacement level of expansion/contraction is presumed to occur by a decline in voltage due to a drop in current resistance (IR) in the actuator film 1, because an electric conductivity of the carbon fine particles is lower than that of a metal.

When the actuator film 1 is small, a decrease in the displacement level due to a decline in voltage does not become a problem. The displacement level of the actuator film 1 depends on the length of the actuator film 1 so that when the overall length of the actuator film 1 is increased to attain a large displacement level, influence of a decline in voltage becomes greater as the distance from the electrode becomes longer. This results in the problem that the displacement cannot exceed a certain level.

In Table 3, the relationship between the size and thickness of the actuator film 1 which permits operation without being greatly influenced by a decrease in the displacement level of expansion/contraction due to a decline in voltage is shown. As the actuator film 1, that prepared by using carbon fine particles of about 50 nm as the conductive fine particles and a perfluorosulfonic acid copolymer as the resin and mixing the resin and fine particles at a weight ratio of 1:0.3 was used. A voltage of 5V was applied. In FIG. 4, the length of the actuator 1 in the direction of an x axis is represented by L, the width in the direction of a y axis is represented by W and the thickness in the direction of a z axis is represented by T.

TABLE 3

| Thickness T (mm) | 0.01 | 0.05 | 0.1 |
|---|---|---|---|
| Length L/W | 0.5 or less | 2 or less | 3 or less |

A decrease in the displacement level due to a decline in voltage can be prevented by some methods as described below.

(1) Fine particles having a high electric conductivity such as gold or platinum are used as the conductive fine particles.

(2) In order to avoid a decline in voltage which will lead to an unignorable decrease in the displacement level, the actuator film 1 is equipped with a metal electrode connected to the terminal electrode 32 as needed.

The above-described method (1) has such a drawback that the preparation method of the actuator film 1 is easy, but compared with that made using carbon fine particles, it becomes heavy and expensive. This drawback can be overcome to some extent by a mixed use of carbon fine particles and metal fine particles. In Example 2, the actuator film 1 described above in (2) and equipped with a metal electrode connected to the terminal electrode 32 will be described.

Figure 5:
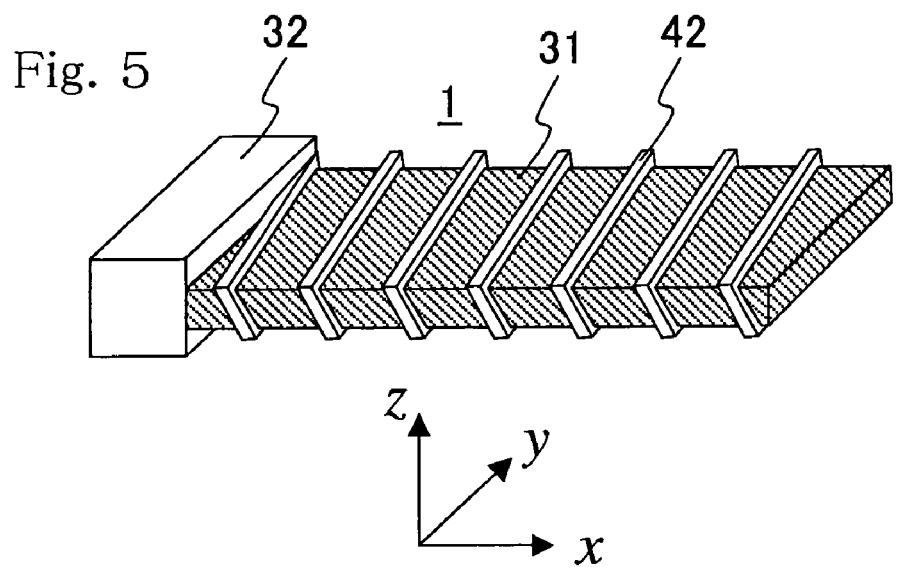
FIG. 5 is a perspective view illustrating an essential structure of an actuator film obtained by spirally adhering a metal electrode to the surface of a mixed film of an ion conductive polymer and conductive fine particles.

FIG. 5 is a perspective view illustrating the structure of the actuator film 1 obtained by spirally winding a metal thin-film electrode 42 connected, at one end thereof, to the terminal electrode 32 around the surface of the mixed film 31 of the ion conductive polymer and conductive fine particles and having a thin film structure, while bringing them into contact. In other words, the metal thin-film electrode 42 connected, at one end thereof, to the terminal electrode 32 and having a high electric conductivity is spirally wound around the surface of the mixed film 31 of the ion conductive polymer and conductive fine particles from one end to the other end of the mixed film 31 with the x axis as a pivot point. When a voltage is applied to produce great expansion/contraction motion in the direction of an x axis on a xyz rectangular one as illustrated in FIG. 5, the metal thin-film electrode 42 has an equal potential in the whole region, which causes a decline in voltage due to IR drop of the actuator film 1 only between the two adjacent spirals of the metal thin-film electrode 42. Accordingly, the distance between the two adjacent spirals of the metal thin-film electrode 42 is decreased, in other words, the thin-film electrode is wound around the mixed film at a high density, a decline in voltage due to IR drop can be suppressed and also a decrease in a displacement level of expansion/contraction motion can be suppressed. Since the metal thin-film electrode 42 of the actuator film 1 is able to have a flexible structure, it does not physically disturb the expansion/contraction motion in the direction of an x axis of the actuator film 1. Although the mixed film of the ion conductive polymer and conductive fine particles for the actuator film 1 has a thin-film structure here, a rectangular parallelepiped or circular cylinder longer in the direction of an x axis can be adopted instead.

More specifically, the mixed film 1 of the ion conductive polymer and conductive fine particles of the actuator film 1 is a rectangular parallelepiped 0.1 mm thick, 2 mm wide and 10 cm long; the metal thin-film electrode 41 is made of platinum 0.3 μm thick and 0.5 mm wide; and the spiral pitch is 3 mm. When expansion/contraction motion of the actuator film 1 having the above-described size is caused in accordance with the constitution illustrated in FIG. 1A to FIG. 1C, the displacement level of about 2 mm can be attained.

The actuator film 1 as illustrated in FIG. 5 can be prepared by preparing the mixed film 31 of the ion conductive polymer and conductive fine particles by the process as described in FIG. 2A to FIG. 2D, placing the resulting film in a vacuum deposition apparatus, and then depositing gold or platinum through a slit while turning the mixed film 31 of the ion conductive polymer and conductive fine particles.

The metal thin-film electrode 42 of a similar level can be obtained by mechanically winding a gold or platinum wire having a diameter of about 0.01 mm without depending on the above-described preparation process utilizing vapor deposition.

After formation of the metal thin-film electrode 42 on the surface of the mixed film 31 of the ion conductive polymer and conductive fine particles, a mixed solution of an ion conductive polymer and conductive fine particles is applied on the resulting electrode by spray coating. Then, the metal thin-film electrode 42 of the actuator film 1 thus obtained is resistant to disconnection and the film has improved durability.

Figure 6A:
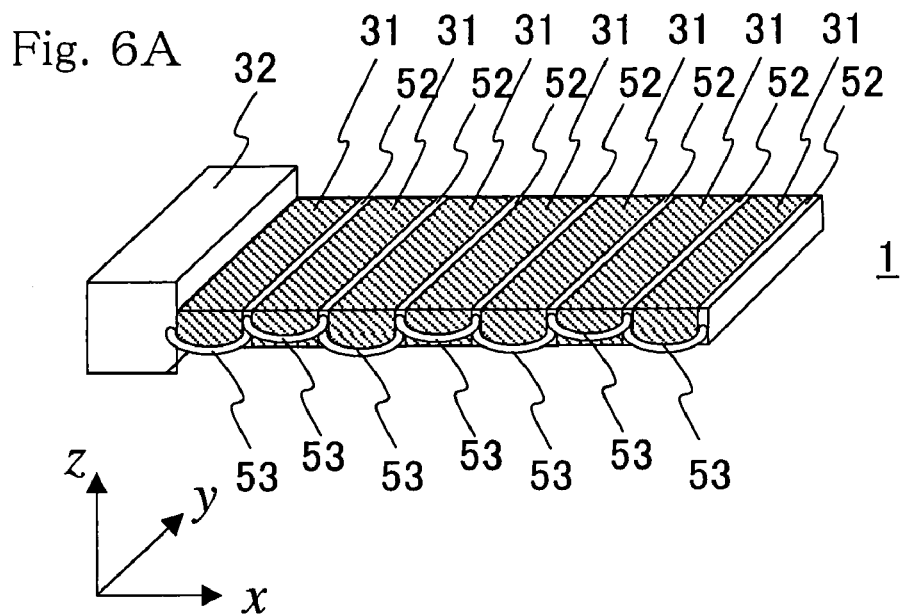
FIG. 6A is a perspective view illustrating an essential structure of an actuator in which mixed films 31 of an ion conductive polymer and conductive fine particles and intermediate metal electrodes 52 connected each other via a conductive wire 53 are stacked alternately along an x axis.
Figure 6B:
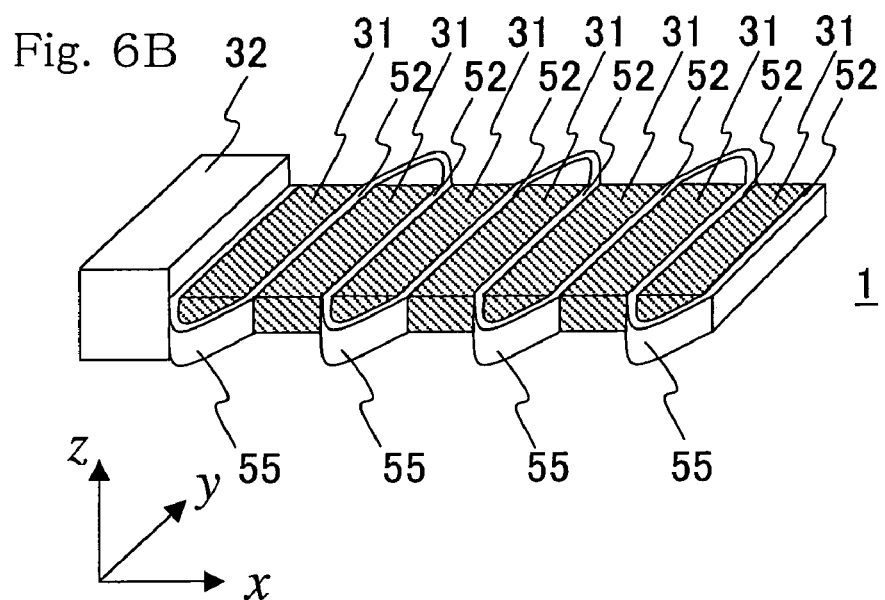
FIG. 6B is a perspective view illustrating an essential structure of an actuator film in which a plurality of mixed films 31 of an ion conductive polymer and conductive fine particles and a metal electrode 55 are stacked alternately along an x axis, and the metal electrode is a continuous but pleated metal foil.

FIG. 6A and FIG. 6B are each a perspective view illustrating an example of an actuator film 1 having the mixed film 31 of the ion conductive polymer and conductive fine particles and a plurality of intermediate metal electrodes 52 disposed alternately. As illustrated in these drawings, the film is expanded/contracted greatly in the direction of an x axis on a xyz rectangular coordinate system.

In each of FIG. 6A and FIG. 6B, the plurality of intermediate metal electrodes 52 are disposed at proper pitches in the mixed film 31 composed of the ion conductive polymer and conductive fine particles. In the example of FIG. 6A, the plurality of intermediate metal electrodes 52 are connected via a conductive crossover wire 53 disposed on the side surface corresponding to the front side of this drawing, while in the example of FIG. 6B, the plurality of intermediate metal electrodes 52 are connected via a conductive crossover thin-film 55 disposed on the side surfaces corresponding to the front side and back side of this drawing. These conductive crossover wire 53 and conductive crossover thin-film 55 are each connected, at one end thereof, to the terminal electrode 32. Although not illustrated here, the intermediate metal electrode 52 which is most distant from the terminal electrode 32 may be connected to the terminal electrode 32 via the conductive crossover wire 53 or conductive crossover thin-film 55.

In each example of FIG. 6A and FIG. 6B, the actuator film 1 has a structure in which the mixed film 31 composed of the ion conductive polymer and conductive fine particles and the intermediate metal electrodes 52 are stacked alternately along an x axis. In this actuator film 1, the intermediate metal electrodes 52 connected via the conductive crossover wire 53 or conductive crossover thin-film 55 have equal potential in all over the region when a voltage is applied to the terminal electrode 32. A decline in voltage due to an IR drop of the actuator film 1 therefore occurs only at a portion between the two adjacent intermediate metal electrodes 52. If the distance between the two adjacent intermediate metal electrodes 52 is shortened, a voltage decline due to an IR drop can be suppressed and, in turn, a decrease in the displacement level of expansion/contraction motion can be suppressed. In other words, a decrease in the displacement level due to a voltage decline can be suppressed by shortening the length of the mixed film 31 of the ion conductive polymer and conductive fine particles sandwiched by the two intermediate metal electrodes 52. The conductive crossover wire 53 or conductive crossover thin-film 55 connected between the intermediate metal electrodes 52 becomes a physical inhibiting factor upon expansion/contraction of the actuator film 1, but use of a thin and flexible material for the conductive crossover wire 53 or conductive crossover thin-film 55 can reduce its influence and prevents it from become a substantial inhibiting factor.

The mixed film 31 of the ion conductive polymer and conductive fine particles as illustrated in FIG. 6A was adjusted to have a thickness of 0.1 mm, a width of 2 mm and a length of 3 mm at a portion sandwiched between the two adjacent intermediate metal electrodes 52. The intermediate metal electrode 52 was made of gold having a thickness of 0.1 mm, width of 2 mm and length of 0.02 mm. The conductive crossover wire 53 was a gold wire having a diameter of 0.01 mm. A combination of the mixed film 31 and the intermediate metal electrode 52 appeared 33 times in repetition, meaning that the overall length of the actuator film 1 was adjusted to be 99.66 mm {=(3 mm+0.02 mm)×33 times}. Of the overall length of 99.66 mm, a portion of the actuator film effective for the expansion/contraction motion is 99 mm (=3 mm×33 times).

In the actuator film 1 illustrated in FIG. 6B, the intermediate metal electrode 52 and the conductive crossover thin-film 55 were formed by one continuous metal foil film. The mixed film 31 of the ion conductive polymer and conductive fine particles had a thickness of 0.1 mm, width of 2 mm and length of 3 mm at a portion sandwiched between the two adjacent intermediate metal electrodes 52 (metal foil film 55). The metal foil film 55 used here was obtained by folding a gold foil having a thickness of 0.005 mm 33 times. The overall length of the actuator film 1 was adjusted to 99.17 mm {=(3 mm+0.005 mm)×33 times+0.005 mm}. Of the overall length of 99.17 mm, a portion of the actuator film effective for the expansion/contraction motion is 99 mm (3 mm×33 times).

When the actuator film 1 as illustrated in FIG. 6A or FIG. 6B is adjusted to have the above-described size and expansion/contraction motion is caused in accordance with the constitution of FIG. 1A to FIG. 1C, the displacement of about 2 mm can be attained.

FIG. 7A to FIG. 7D are each a schematic view illustrating the preparation steps of the actuator film 1 shown in FIG. 6A.

Figure 7A:
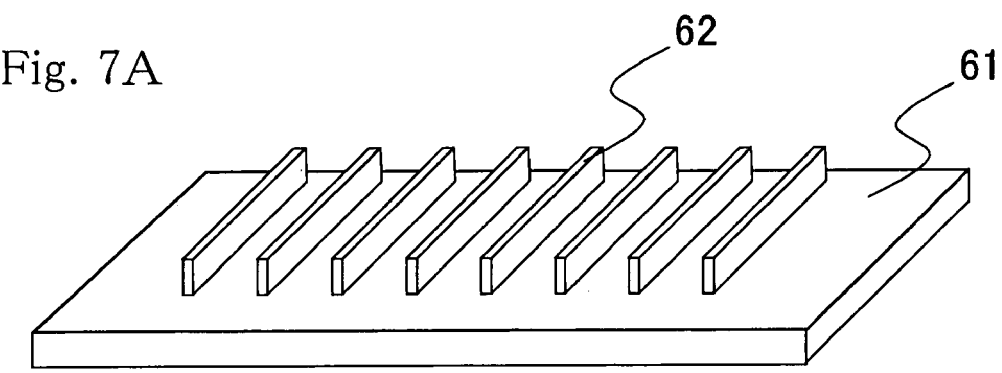
FIG. 7A is a schematic view illustrating, among preparation steps of the actuator of FIG. 6A, a step of preparing gold line and space patterns 62 having a height of 0.1 mm, a width of 0.02 mm and a pitch of 3.02 mm on the surface of a substrate 61 by the micromachine technology using gold plating and lithography.
Figure 7B:
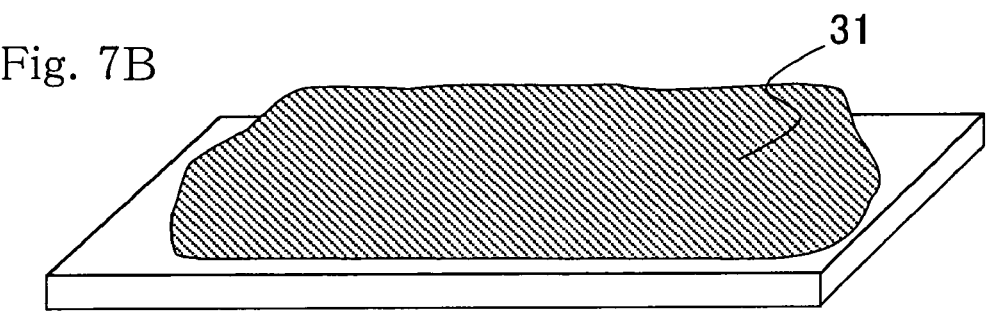
FIG. 7B is a schematic view illustrating, among the preparation steps of the actuator of FIG. 6A, a step of applying a fine-particle-containing solution 14 to embed therewith a space between gold line and space patterns 62, followed by high temperature drying to prepare a mixed film 31 of an ion conductive polymer and conductive fine particles and including gold electrodes.
Figure 7C:
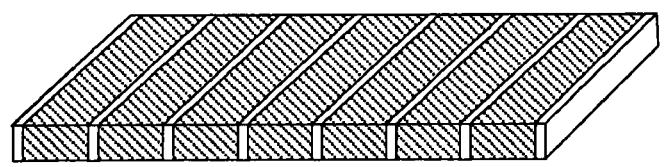
FIG. 7C is a schematic view illustrating, among the preparation steps of the actuator of FIG. 6A, a step of peeling the mixed film 31 of an ion conductive polymer and conductive fine particles from the substrate 61 and cutting the film into a desired shape having a thickness of 0.1 mm, width of 2 mm and overall length of 99.66 mm.
Figure 7D:
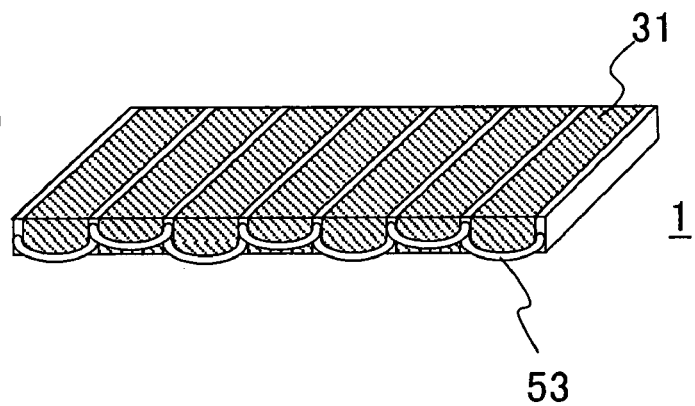
FIG. 7D is a schematic view illustrating, among the preparation steps of the actuator of FIG. 6A, a step of connecting the gold electrodes of the line and space patterns 62 via a gold wire 64 or platinum wire having a diameter of 0.01 mm to complete the actuator film.

Gold line and space patterns 62 each having a height of 0.1 mm, width of 0.02 mm and pitch of 3.02 mm are formed over the surface of a substrate 61 by the micromachine technology using a gold plating and lithography (FIG. 7A). The gold used here may be replaced with platinum. The fine-particle-containing solution 14 described in FIG. 2A to FIG. 2D of Example 1 is then applied so that it will be inserted in the space between the gold line and space patterns 62, followed by high temperature drying to form a mixed film 31 of an ion conductive polymer and conductive fine particles including the gold electrodes of the line and space patterns 62 (FIG. 7B). The mixed film 31 of an ion conductive polymer and conductive fine particles is then peeled off from the substrate 61, while including the gold electrodes of the line and space patterns 62 and it is cut into a film having a thickness of 0.1 mm, width of 2 mm and overall length of 99.66 mm (FIG. 7C). In the final step, gold electrodes of the line and space patterns 62 are connected each other via a gold wire 53 or platinum wire having a diameter of 0.01 mm. Although not illustrated here, by bonding the resulting film with the terminal electrode 32, the formation of the actuator film 1 is completed (FIG. 7D).

Figure 8A:
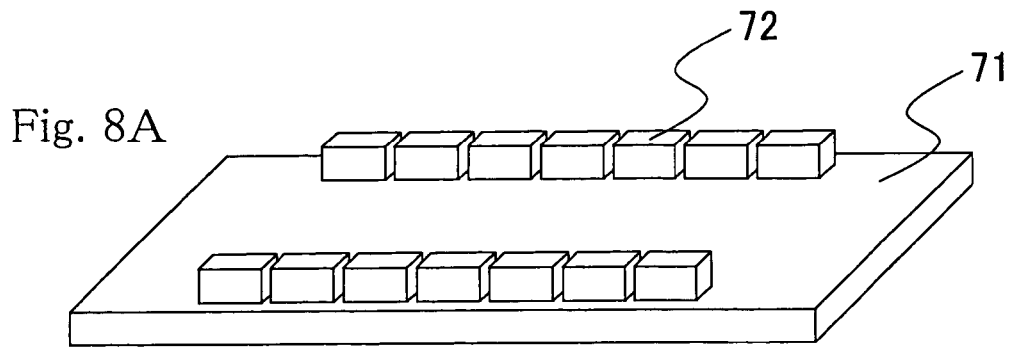
FIG. 8A is a schematic view illustrating, among preparation steps of the actuator of FIG. 6B, a step of arraying synthetic resin walls 72 having a height of 1 mm, width of 1 mm and length of 2.5 mm in the x direction on the surface of a substrate 71 with a pitch of 3.005 mm and then disposing two rows of these synthetic resin wall arrays in the y direction at an interval of 2 mm.
Figure 8B:
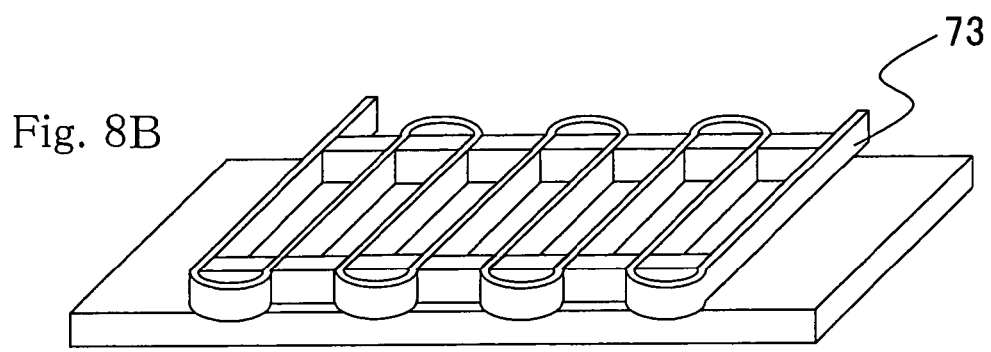
FIG. 8B is a schematic view illustrating, among the preparation steps of the actuator of FIG. 6B, a step of inserting a gold foil 73 having a thickness of 0.005 mm in the space between synthetic resin walls 72 in the pleated form.
Figure 8C:
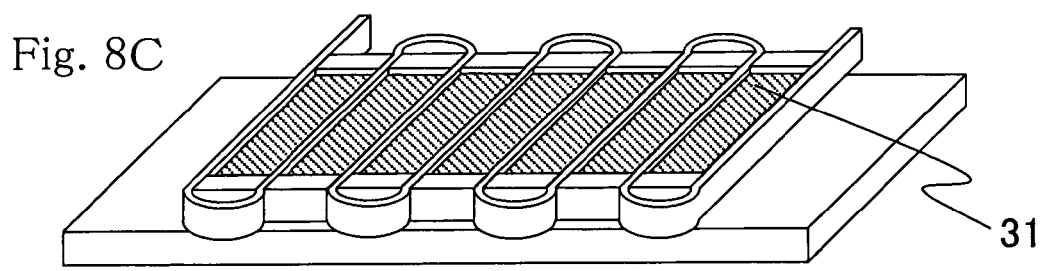
FIG. 8C is a schematic view illustrating, among the preparation steps of the actuator of FIG. 6B, a step of applying a fine-particle-containing solution 14 to a portion surrounded by the gold foil 73 and synthetic resin walls 72, followed by high temperature drying to prepare a mixed film 31 of an ion conductive polymer and conductive fine particles including a metal electrode.
Figure 8D:
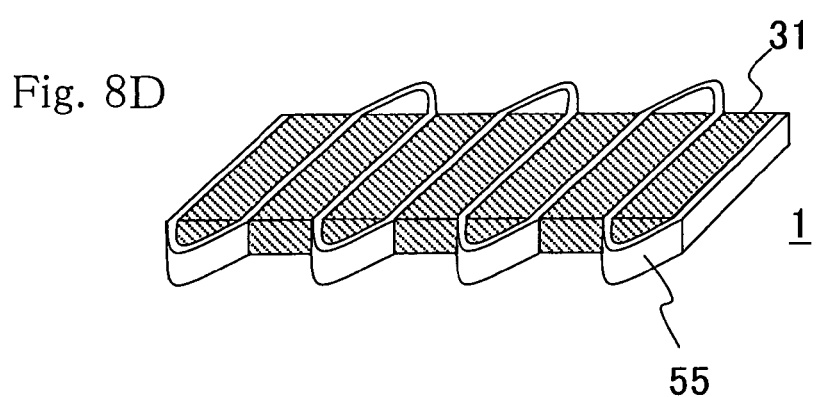
FIG. 8D is a schematic view illustrating, among the preparation steps of the actuator of FIG. 6B, a step of peeling an actuator film 74 from the substrate 71 and forming it into a film having a thickness of 0.1 mm and an overall length of 99.17 mm to complete the actuator film.

FIG. 8A to FIG. 8D are schematic views illustrating the preparation steps of the actuator film 1 illustrated in FIG. 6B. Over the surface of a substrate 71, synthetic resin walls 72 having a height of 1 mm, width of 1 mm and length of 2.5 mm are arrayed with a pitch of 3.005 mm in the x direction. Two rows of these walls are arrayed at an interval of 2 mm in the y direction (FIG. 8A). A gold foil 2 having a thickness of 0.005 mm is inserted in each of the spaces between the synthetic resin walls 72 (FIG. 8B). The mixed solution 14 of the ion conductive polymer and conductive fine particles as described in FIG. 2A to FIG. 2D of Example 1 is applied to a portion surrounded by the gold foil 73 and synthetic resin walls 72, followed by high temperature drying to prepare a gold-electrode-containing mixed film 31 of the ion conductive polymer and conductive fine particles (FIG. 8C). In the final step, the gold-electrode-containing mixed film 31 composed of the ion conductive polymer and conductive fine particles is peeled off from the substrate 71 and it is formed into a shape 0.1 mm in thickness and 99.17 mm in overall length. Although not illustrated here, the film thus formed is bonded to a terminal electrode 32, whereby preparation of the actuator film 1 is completed (FIG. 8D).

Figure 9:
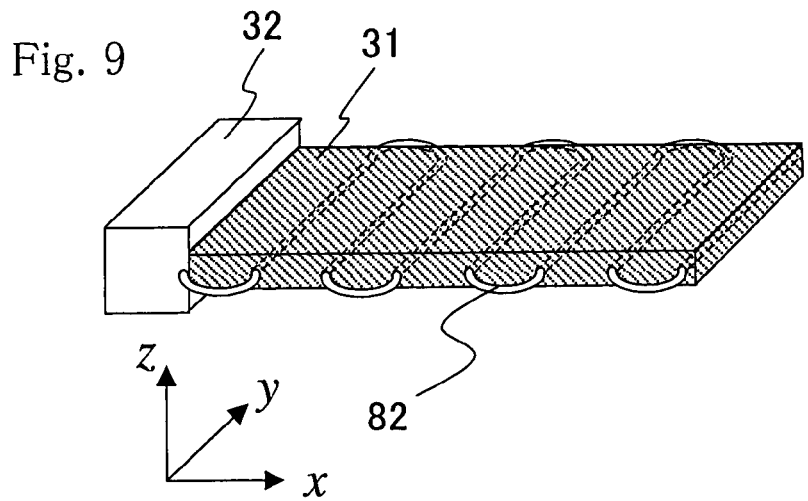
FIG. 9 is a perspective view illustrating an essential structure of an actuator film 1 having a metal electrode wired inside of a mixed film of an ion conductive polymer and conductive fine particles.

FIG. 9 is a perspective view illustrating an actuator film 1 having a metal electrode wired inside thereof. As illustrated in the drawing, expansion/contraction motion is produced in the direction of an x axis on a xyz rectangular coordinate system. Inside of the actuator film 1 in the rectangular parallelepiped form longer in the direction of an x axis, the metal electrode 82 which is contiguous and has a high electric conductivity is embedded from one end-face portion to the other end-face portion of the actuator film. It is wired so that the two facing portions are disposed vertically to the x axis and spaced equally each other in parallel. When a voltage is applied to this actuator film 1, the potential of the metal electrode 82 becomes uniform in the whole region. Similar to the actuator film 1 as illustrated in FIG. 6A and FIG. 6B, a decrease in the displacement level due to a decline in voltage can be suppressed by shortening the distance between the two adjacent portions of the metal electrode 82.

As the mixed film 31 of the ion conductive polymer and conductive fine particles, a rectangular parallelepiped 0.1 mm thick, 2 mm wide and 10 cm long was used, while as the metal electrode 82, a gold wire having a diameter of 0.01 mm and folded 33 times was used.

When expansion/contraction motion of the actuator film 1 of FIG. 9 is produced by using the system as illustrated in FIG. 1 of Example 1, the displacement of about 2 mm can be attained.

FIG. 10A to FIG. 10E are schematic views illustrating the preparation steps of the actuator of FIG. 9.

Figure 10A:
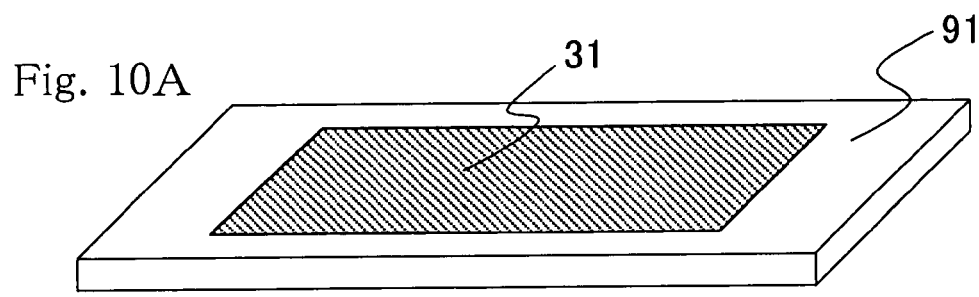
FIG. 10A is a schematic view illustrating, among preparation steps of the actuator of FIG. 9, a step of pouring a fine-particle-containing solution 14 described in FIG. 2A to FIG. 2D of Example 1 along the groove of the substrate 91, followed by drying to form a mixed film 31 of an ion conductive polymer and conductive fine particles.
Figure 10B:
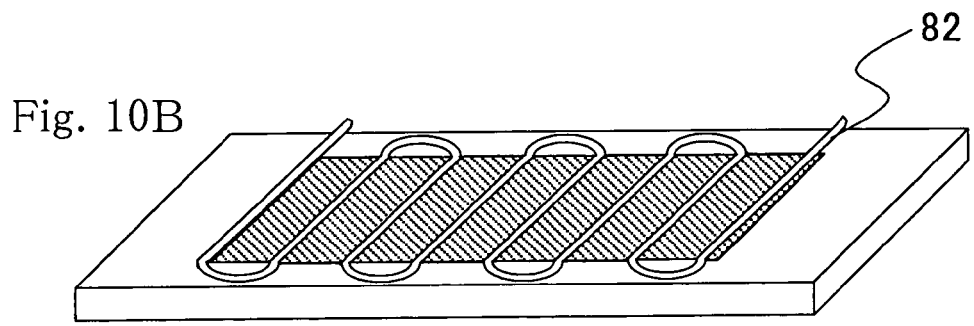
FIG. 10B is a schematic view illustrating, among the preparation steps of the actuator of FIG. 9, a step of disposing a gold wire 82 having a diameter of 0.01 mm on the surface of the mixed film 31 composed of an ion conductive polymer and conductive fine particles, from one end portion to the other end portion of the film while folding it with a pitch of 3 mm so that each portion of the wire becomes vertical to the x axis.
Figure 10C:
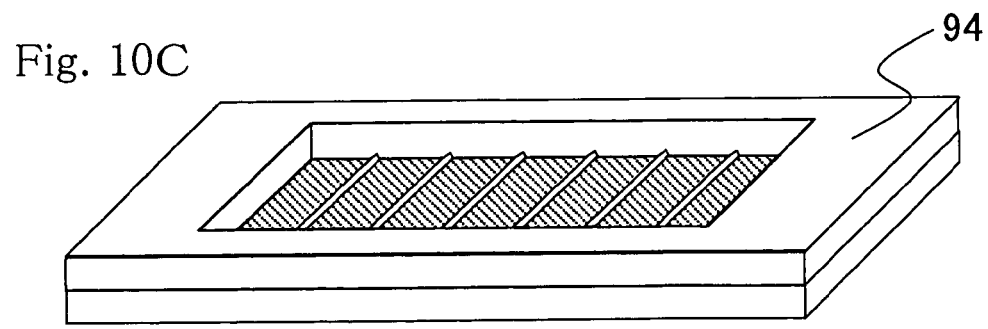
FIG. 10C is a schematic view illustrating, among the preparation steps of the actuator of FIG. 9, a step of laying and fixing a mold 94 having a hole 0.05 mm deep, 2 mm wide and 10 cm long over the mixed film 31 of an ion conductive polymer and conductive fine particles having a gold wire 93 disposed inside of the mixed film.
Figure 10D:
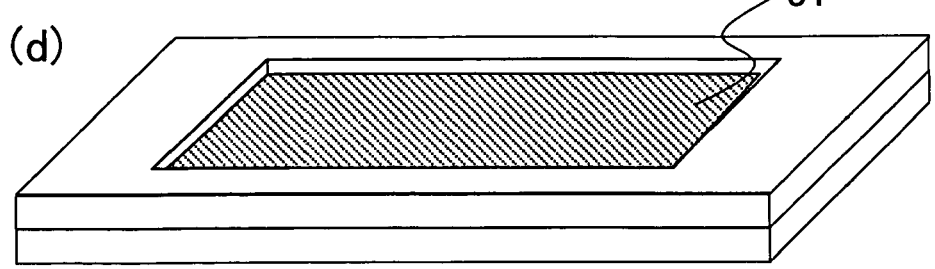
FIG. 10D is a schematic view illustrating, among the preparation steps of the actuator of FIG. 9, a step of, after fixation of the mold 94, pouring the fine-particle-containing solution 14 as described in FIG. 2A to FIG. 2D of Example 1 in the hole, followed by high temperature drying to prepare another mixed film 31 of an ion conductive polymer and conductive fine particles having an electrode disposed inside of the film.
Figure 10E:
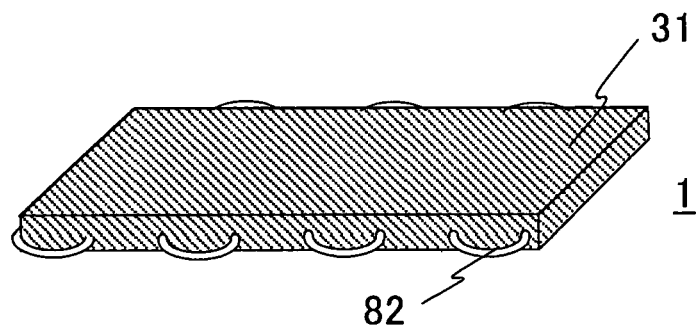
FIG. 10E is a schematic view illustrating, among the preparation steps of the actuator of FIG. 9, a step of, after drying, removing the mold 94 and peeling the mixed film 31 of an ion conductive polymer and conductive fine particles from the substrate 91 to complete the preparation of an actuator film.

First, a groove 0.05 mm thick, 2 mm wide and 10 cm long is made in the surface of a substrate 91 by the micromachine technology. Then, along the groove of the substrate 91, the fine-particle-containing solution 14 as described in FIG. 2A to FIG. 2D of Example 1 is poured, followed by drying to prepare a mixed film 31 composed of an ion conductive polymer and conductive fine particles (FIG. 10A). On the surface of the mixed film 31 composed of an ion conductive polymer and conductive fine particles, a gold wire 82 having a diameter of 0.01 mm is disposed from one end portion to the other end portion of the film while folding it with a pitch of 3 mm so that each portion of the wire becomes vertical to the x axis, as illustrated in the drawing (FIG. 10B). A mold 94 having a hole 0.05 mm deep, 2 mm wide and 10 cm long is laid on the surface of the mixed film 31 of an ion conductive polymer and conductive fine particles with the metal wire 82 disposed on the surface and it is fixed integrally with the substrate 91 (FIG. 10C). After the mold 94 is fixed, the fine-particle-containing mixed solution 14 as described in FIG. 2A to FIG. 2D of Example 1 is poured in the hole, followed by high temperature drying, whereby the mixed film 31 of an ion conductive polymer and conductive fine particles including the wired electrode inside (FIG. 10D). After drying, the mold 94 is removed and the mixed film 31 of an ion conductive polymer and conductive fine particles is peeled off from the substrate 91. Although not illustrated here, by joining the mixed film with a terminal electrode 32, the formation of an actuator film 1 is completed (FIG. 10E).

The actuator film 1 described here is in the rectangular parallelepiped and that another form is not described. The actuator film 1 in the cylindrical form however can also be used. Described specifically, on a substrate 91 having a notch with a half-round cross-section, a mixed film 31 of an ion conductive polymer and conductive fine particles and having a half-round cross-section is formed. As illustrated in FIG. 10B, on the surface of the mixed film 31 of an ion conductive polymer and conductive fine particles, a gold wire 93 having a diameter of 0.01 mm is disposed from one end portion to the other end portion of the film while folding it in repetition with a pitch of 3 mm so that each folded portion of the gold wire becomes vertical to the x axis. Then, as illustrated in FIG. 10C, an upper mold 94 is laid and a mixed film 31 composed of an ion conductive polymer and conductive fine particles is formed. The upper mold 94 may be in the form of upside down substrate 91 having, a notch with a half-round cross-section.

EXAMPLE 3

Figure 11A:
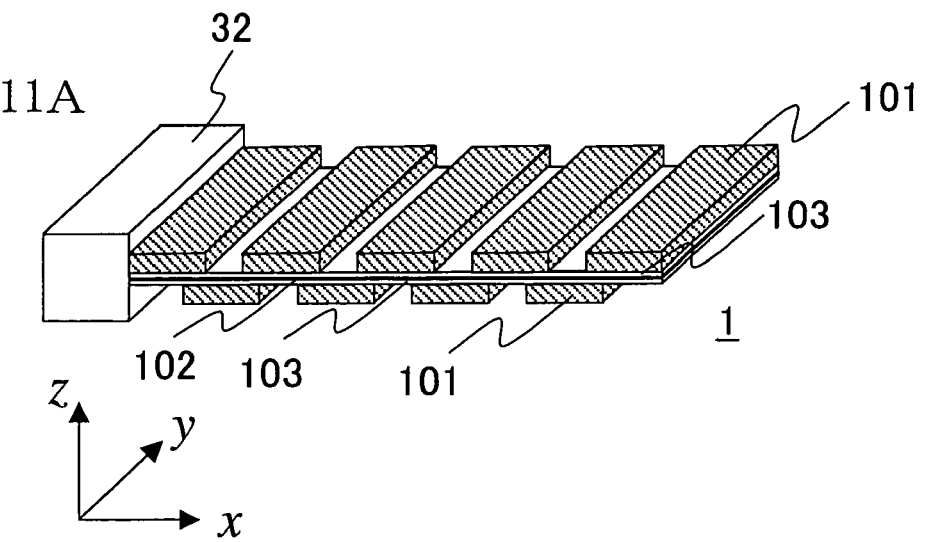
FIG. 11A is a schematic view illustrating an essential structure of an actuator for converting expansion/contraction motion of an actuator film to bending motion having a large displacement level and obtaining it as expansion/contraction motion in a uniaxial direction, and a state of the actuator prior to application of a voltage.
Figure 11B:
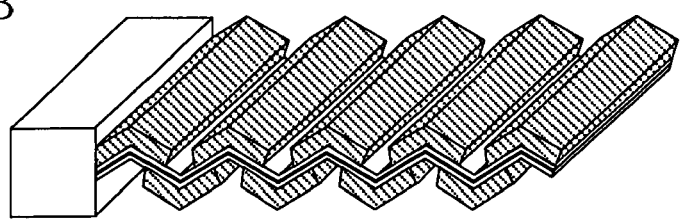
FIG. 11B is a schematic view illustrating an essential structure of the actuator for converting expansion/contraction motion of an actuator film to bending motion having a large displacement level and obtaining it as expansion/contraction motion in a uniaxial direction, and motion of the actuator when a voltage is applied thereto.

FIG. 11A and FIG. 11B are each a schematic diagram illustrating an essential structure and operation principle of an actuator film for converting expansion/contraction motion of the actuator film to bending motion having a large displacement level and obtaining as expansion/contraction motion in a uniaxial direction. FIG. 11A illustrates the motion before application of a voltage, while FIG. 11B illustrates the motion when a voltage is applied. The actuator film 1 is composed of a unit actuator film 101, a resin thin-film 102, a conductor 103 covering both surfaces of the resin thin-film 102 and a terminal electrode 32 for connection with a power supply. As illustrated in the drawing, large expansion/contraction motion is produced in the direction of an x axis on a xyz rectangular coordinate system. The resin thin-film 102 is a rectangular parallelepiped longer in the x direction and thin in the z direction.

This actuator film 1 has a plurality of unit actuator films 101 adhered in a row in the direction of an x axis at predetermined distances on both sides of a flexible resin thin-film 102 covered, at both sides thereof, with a conductor 103. The unit actuator films 101 are the same in size and distance between the surface side and back side, but they are disposed so that the center of each unit actuator film on the back side comes at the center of the space between two adjacent unit actuator films 101 on the surface side.

When a voltage is applied, a decline in voltage occurs only in the z axis direction because each unit actuator film 101 is brought into contact with the conductor 103 on the xy plane. The film is very thin in the z axis direction so that a decrease in the displacement level due to a decline in voltage can be neglected substantially. Each unit actuator film 101 tries to expand or contract in the x direction. It is however fixed, on one side thereof, by the conductor 103 and the resin thin-film 102. This unimorph structure converts the motion to bending motion as illustrated in FIG. 11B. This bending motion appears as large expansion/contraction motion of the actuator film 1 in the x axis direction.

The unit actuator film 101 used here has a thickness of 0.05 mm, width of 2 mm and length of 6 mm. The distance between two adjacent unit actuator films 101 is 4 mm. The unit actuator films on the surface side and on the back side are the same in size and disposed at the same intervals, but they are disposed so that the center of each unit actuator film 101 on the back side exists at the center of the space between the two adjacent unit actuator films 101 on the surface side. The resin thin-film 102 is a polyethylene thin film 0.01 mm thick, 2 mm wide and 10 cm long. Platinum having a thickness of 0.2 µm is employed as the conductor 103. Instead of polyethylene, a flexible thin film such as polyimide or polyvinylidene chloride can be used as the resin thin film.

FIG. 12A to FIG. 12D are each a schematic view illustrating the preparation steps of the actuator film 1 illustrated in FIG. 11A.

Figure 12A:
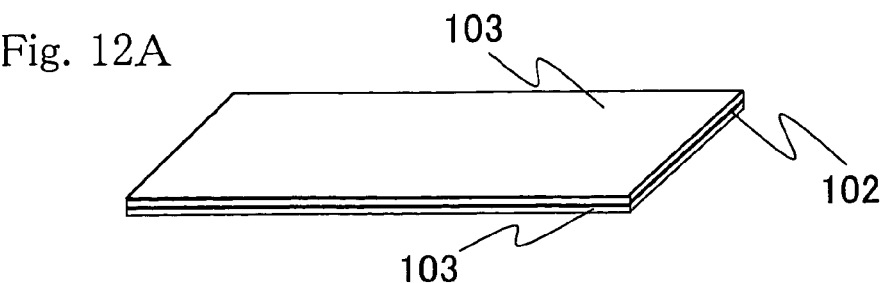
FIG. 12A is a schematic view illustrating, among preparation steps of the actuator of FIG. 11A, a step of depositing platinum 103 to give a thickness of 0.2 µm on both sides of a polyethylene thin film 102.
Figure 12B:
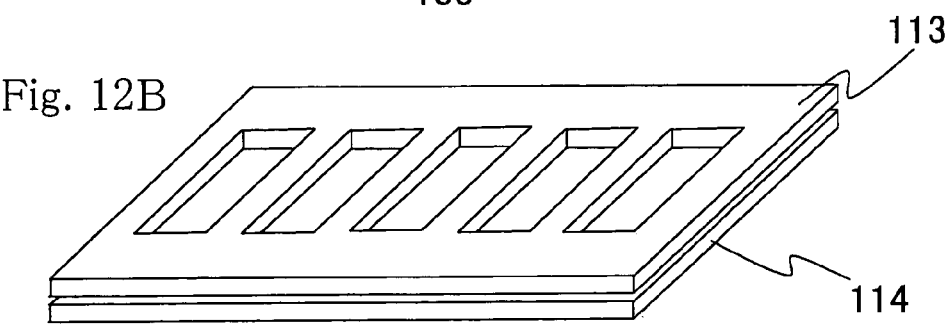
FIG. 12B is a schematic view illustrating, among the preparation steps of the actuator of FIG. 11A, a step of disposing two molds 113,114 having rectangular holes each having a depth of 0.05 mm, width of 2 mm and length of 6 mm arrayed at intervals of 4 mm on both sides of the polyethylene thin film 102 covered with platinum 103 as illustrated in FIG. 12A to sandwich the polyethylene thin film 102 between them.
Figure 12C:
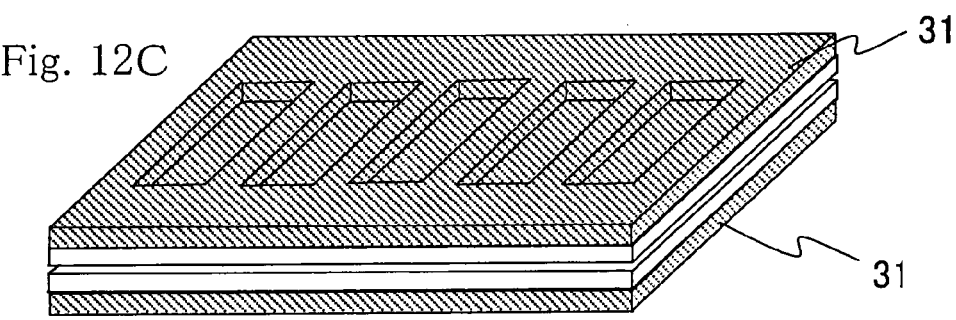
FIG. 12C is a schematic view illustrating, among the preparation steps of the actuator of FIG. 11A, a step of spray coating, with the molds 113,113 as a mask, the fine-particle-containing mixed solution 14 as described in FIG. 2A to FIG. 2D of Example 1 on both sides of the polyethylene thin film 102 covered with the platinum 103, followed by high temperature drying to form mixed films 31 of an ion conductive polymer and conductive fine particles.
Figure 12D:
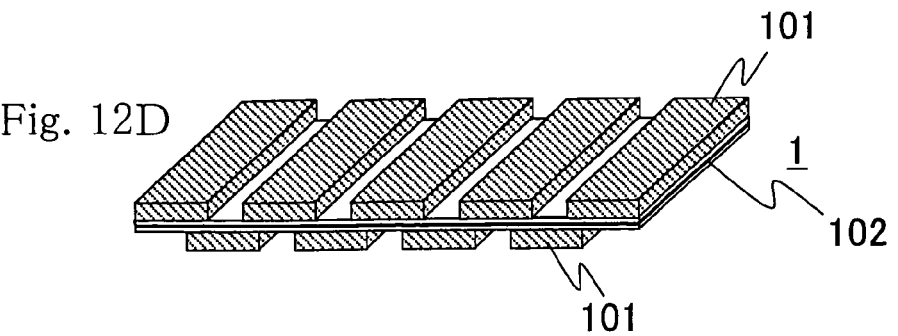
FIG. 12D is a schematic view illustrating, among the preparation steps of the actuator of FIG. 11A, a step of removing the molds 113,114 and forming the film into a desired shape to complete the actuator film.

First, platinum 103 is deposited to give a thickness of 0.2 µm on both sides of a polyethylene thin film 102 (FIG. 12A). On both sides of the polyethylene thin film 102 covered with platinum 103 as illustrated in FIG. 12A, two molds 113,114 having rectangular holes, each having a depth of 0.05 mm, width of 2 mm and length of 6 mm, at intervals of 4 mm are disposed to sandwich the polyethylene thin film 102 between them (FIG. 12B). With the molds 113,113 as a mask, the fine-particle-containing mixed solution 14 as described in FIG. 2A to FIG. 2D of Example 1 is spray coated on both sides of the polyethylene thin film 102 covered with the platinum 103, followed by drying to form a mixed film 31 of an ion conductive polymer and conductive fine particles (FIG. 12C). In the final step, the molds 113,114 are removed and the film of a desired shape is obtained (FIG. 12D). Although not illustrated here, by joining the resulting film with a terminal electrode 32, the preparation of the actuator film 1 is completed.

EXAMPLE 4

The actuator films according to the present invention and materials used for them were described in Examples 1 to 3. In Example 4, a composition example of an actuator using the actuator film of the present invention and its application example will be described based on FIGS. 13A, 13B, 14A, 14B and 15.

The actuator film of the present invention can expand or contract only in an electrolyte solution. In order to use it for a general purpose actuator, an expansion/contraction motion of the actuator film must be transmitted outside the electrolyte solution. It is necessary to impart the actuator with a structure not permitting leakage of the electrolyte solution outside. A description will next be made of an actuator using the actuator film.

Figure 13A:
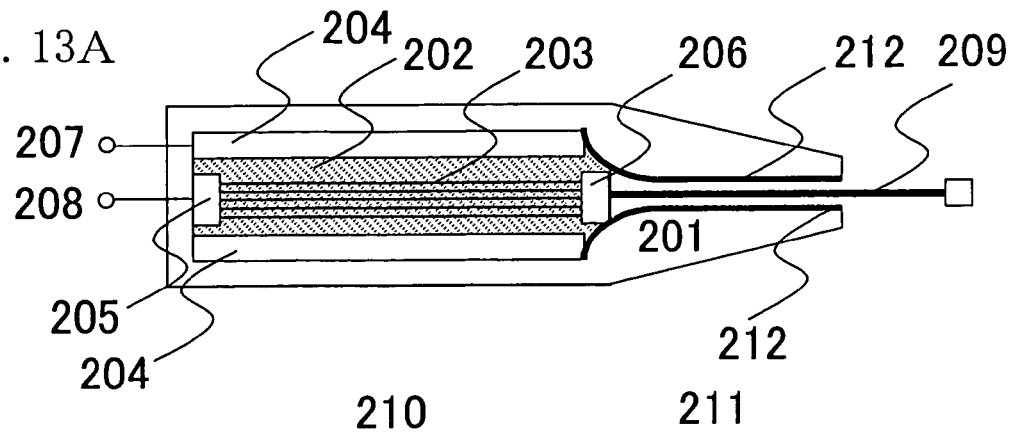
FIG. 13A is a schematic view illustrating an actuator which is expanding in order to externally transmit the expansion/contraction motion of the actuator of Example 3 via a wire.
Figure 13B:
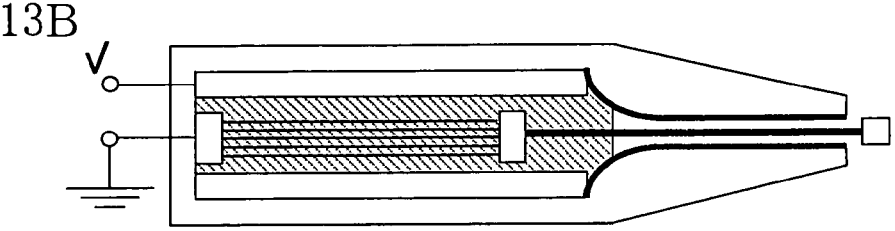
FIG. 13B is a schematic view illustrating an actuator 203 which is contracting by the application of a voltage thereto in order to externally transmit the expansion/contraction motion of the actuator of Example 3 via a wire.

FIG. 13A and FIG. 13B are each a schematic view illustrating the principle of an actuator on which expansion/contraction motion is transmitted outside via a wire.

FIG. 13A is a cross-sectional view of an actuator when the actuator film expands, that is, an actuator in the state as described in FIG. 1A. This actuator is composed of an outer frame 201, an electrolyte solution 202 contained therein, an actuator film 203, a counter electrode 204, actuator-film retaining portions 205,206, externally transmitting electrodes 207,208 and a water repellent wire 209 for externally transmitting the expansion/contraction motion of the actuator film 203 in the electrolyte solution 202. The inside of the outer frame 201 is divided into a portion 210 in which the electrolyte solution 202 exists and another portion 211 through which the wire passes. The portion 210 storing the electrolyte solution 202 therein is covered with the counter electrode 204 so that a portion of its side wall surrounds the actuator film 203 therewith; and it has a capacity enough for expansion/contraction motion of the actuator film 203. The portion 211 through which the wire 209 passes is covered with a water repellent material 212 and it has a cylindrical hole large enough to permit the passage of the wire 209. The counter electrode 204 is connected with the transmitting electrode 207. The actuator film 203 is connected, at one end thereof, with the transmitting electrode 208 via the conductive retaining portion 205 and, at another end, with the wire 209 for transmitting the expansion/contraction motion outside via the retaining portion 206. Each of the transmitting electrodes 207,208 is partially embedded in the outer frame 201 to prevent leakage of the electrolyte solution 202 to the outside and partially connected with the outside of the outer frame 201. The actuator film 203, together with the electrolyte solution 202, exists in the portion 210 of the outer frame 201. The wire 209 exists in the portion 211 of the outer frame 201. Here, the actuator film retaining portion 205 corresponds to a terminal electrode 32. Another actuator film retaining portion 206 may be employed as a terminal electrode on the other side. The actuator film 203 has a plurality of actuator films 1 stacked one after another.

By the application of a voltage between the transmitting electrodes 207,208, the actuator 203 inside of the outer frame 201 produces expansion/contraction motion in the electrolyte solution 202. FIG. 13B illustrates the state of the actuator when the actuator film 203 contracts by the application of a voltage, which is similar to the state as described in FIG. 1C. The expansion/contraction motion of the actuator 203 is transmitted outside of the outer frame 201 via the wire 209. Leakage of the electrolyte solution 202 to the outside is blocked by a capillary action, because the contact angle of the electrolyte solution 202 with the portion 211 of the outer frame 201 becomes 90° or greater.

As described above, use of the actuator as described in FIG. 13A makes it possible to transmit, by applying a voltage between the transmitting electrodes 207,208, the expansion/contraction motion of the actuator 203 in the electrolyte solution 202 to the outside of the electrolyte solution 202 without causing leakage of the electrolyte solution 202 to the outside.

In this Example, polyethylene was used as a material of the outer frame 201, the 0.15N aqueous solution of sodium chloride as described in FIG. 1A of Example 1 was used as the electrolyte solution 202, a bundle of a plurality of essential structures in the fibrous form as illustrated in FIG. 4 of Example 2 was used as the actuator film 203, cylindrical platinum was used as the counter electrode 204, a platinum jig was used as the actuator film retaining portions 205,206, a copper wire having a surface coated with platinum was used as the externally transmitting electrodes 207,208, a synthetic resin wire was used as the wire 209, and a porous fluorine resin was used as the water repellent material 212. The risk of the leakage of the electrolyte solution 202 to the outside of the outer frame 201 can be reduced more by using a water soluble polymer electrolyte such as sodium polyacrylate as the electrolyte or by gelling the electrolyte to thicken the solution.

Any one of the essential structures as described in Example 2 with reference to FIG. 5, FIG. 6A, FIG. 6B, FIG. 9 and FIG. 11A can be employed instead of that of the actuator film 203 illustrated in Example 2 with reference to FIG. 4. The motion of the wire 209 can be made smoother by inserting liquid paraffin or grease in the portion 211 through which the wire 209 passes. In this case, there is however a danger of a gas being produced in the electrolyte solution by an overvoltage when the actuator starts operation so that for the sake of safety, it is recommended to attach a valve for releasing a gas. In order to attain a greater displacement level, a bobbin may be disposed at the portion 210 of the outer frame 201 to take up the actuator film 203 having a long overall length.

As described above, even if a voltage applied to the actuator film 203 is removed from the state illustrated in FIG. 13B, the state of FIG. 13B is changed to that in FIG. 13A in which the wire 209 has been pushed by the actuator film 203. It is necessary to apply an external force to pull out the wire 209 as illustrated in FIG. 13A in response to the expansion of the actuator film 203. The expansion/contraction may be increased by applying a voltage as illustrated in FIG. 1B to the actuator film in the expanded form.

Figure 14A:
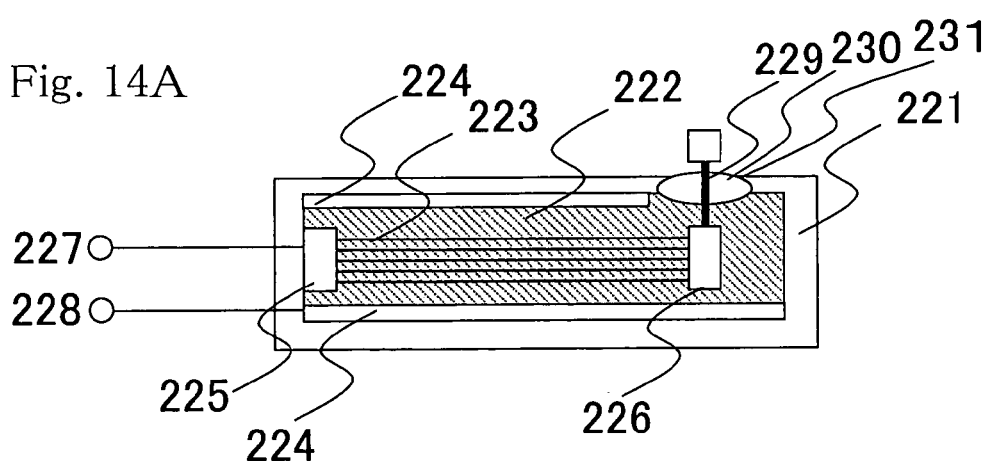
FIG. 14A is a schematic view illustrating an actuator which is expanding in order to externally transmit the expansion/contraction motion of the actuator of Example 3 via leverage.
Figure 14B:
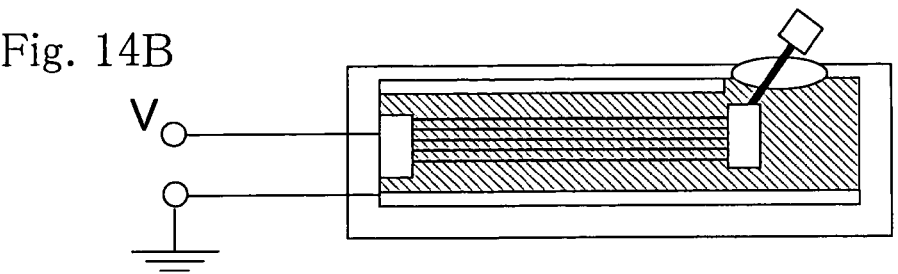
FIG. 14B is a schematic view illustrating an actuator 203 to which a voltage has been applied in order to externally transmit the expansion/contraction motion of the actuator of Example 3 via leverage and which is contracting by this application of a voltage.

FIG. 14A and FIG. 14B are each a schematic cross-sectional view illustrating the principle of an actuator which transmits the expansion/contraction motion of an actuator film outside by making use of leverage.

FIG. 14A illustrates the state of an actuator when the actuator film is expanded. This actuator has an outer frame 221, an electrolyte solution 222 contained therein, an actuator film 223, a counter electrode 224, actuator film retaining portions 225, 226, externally transmitting electrodes 227, 228, a rod 229 for externally transmitting the expansion/contraction motion of the actuator film 223 in the electrolyte solution 222, and an elastomer 230 for fixing the rod. Inside of the outer frame 221, its wall surface is partially covered with the counter electrode 224 and there exists a capacity sufficient for the expansion/contraction motion of the actuator film 223. The counter electrode 224 is connected to the transmitting electrode 227. The actuator film 223 is connected, at one end thereof, to the transmitting electrode 228 via the retaining portion 225 and at the other end, to the rod 229 for externally transmitting the expansion/contraction motion via the retaining portion 226. The transmitting electrodes 227, 228 are, in some part, embedded in the outer frame 221 to prevent leakage of the electrolyte solution 222 to the outside and, in the other part, linked to the outside of the outer frame 221. The rod 229 is, at one end thereof, embedded in the actuator film 223 in the outer frame 221; at the other end, linked to the outside of outer frame 221; and at the center, embedded in the hole 231 made through the surface in the outer frame 221 by the elastomer 230. The actuator film retaining portion 225 in this example corresponds to the terminal electrode 32. The other actuator film retaining portion 226 may be used as a terminal electrode on the other side.

Application of a voltage between the transmitting electrodes 227 and 228 causes expansion/contraction motion of the actuator film 223 inside of the outer frame 221 in the electrolyte solution 222. FIG. 14B illustrates the actuator when the actuator film 223 contracts by the application of a voltage. Owing to the contraction of the actuator film 223, the rod 229 is drawn in the contraction direction. Since the rod 229 is fixed at the center thereof by the elastomer 230, a force generated by the contraction motion of the actuator film 223 is transmitted, with the fixed point as a fulcrum, to the outside of the outer frame 221 as a force in the direction opposite to the contraction direction. The hole 231 of the outer frame 221 is sealed by the elastomer 230 so that leakage of the electrolyte solution 222 to the outside of the outer frame 221 never occurs.

When the actuator as illustrated in FIG. 14A is employed as described above, application of a voltage between the transmitting electrodes 227 and 228 leads to the transmission of the expansion/contraction motion of the actuator film 223 in the electrolyte solution 222 to the outside of the electrolyte solution 222 without causing leakage of the electrolyte solution 222 to the outside. The displacement level of the rod 229 outside the outer frame 221 can be adjusted not only by the displacement of the actuator film 223 but also by a change in the length of the rod 229 inside or outside of the outer frame 221.

In this Example, polyethylene was used as a material of the outer frame 221, the 0.15N aqueous solution of sodium chloride as described in FIG. 1A of Example 1 was used as the electrolyte solution 222, a bundle of a plurality of fibrous essential structures as illustrated in FIG. 4 of Example 2 was used as the actuator film 223, platinum was as a material for the counter electrode 224, a platinum jig was used as the actuator film retaining portions 225, 226, a copper wire having a surface coated with platinum was used as the externally transmitting electrodes 227, 228, a stainless wire of 2 mm in diameter and 5 mm in overall length was used as the rod 229 and a polyurethane resin as the elastomer 230. As well as the essential structure as illustrated in FIG. 4 of Example 2, any one of the essential structures as illustrated in FIG. 5, FIG. 6A, FIG. 6B, FIG. 9 and FIG. 11A may be used for the actuator film 223. In this case, there is a danger of a gas being produced in the electrolyte solution by an overvoltage when the actuator starts operation so that for the sake of safety, it is recommended to attach a valve for releasing a gas. In order to attain a greater displacement level, a bobbin may be disposed inside of the outer frame 221 to take up the actuator film 223 having a long overall length.

Here, the resilience of the elastomer is utilized as an outer force to convert the state of FIG. 14B to FIG. 14A in response to the expansion of the actuator film 223 by the removal of a voltage applied to the actuator film 223.

Figure 15:
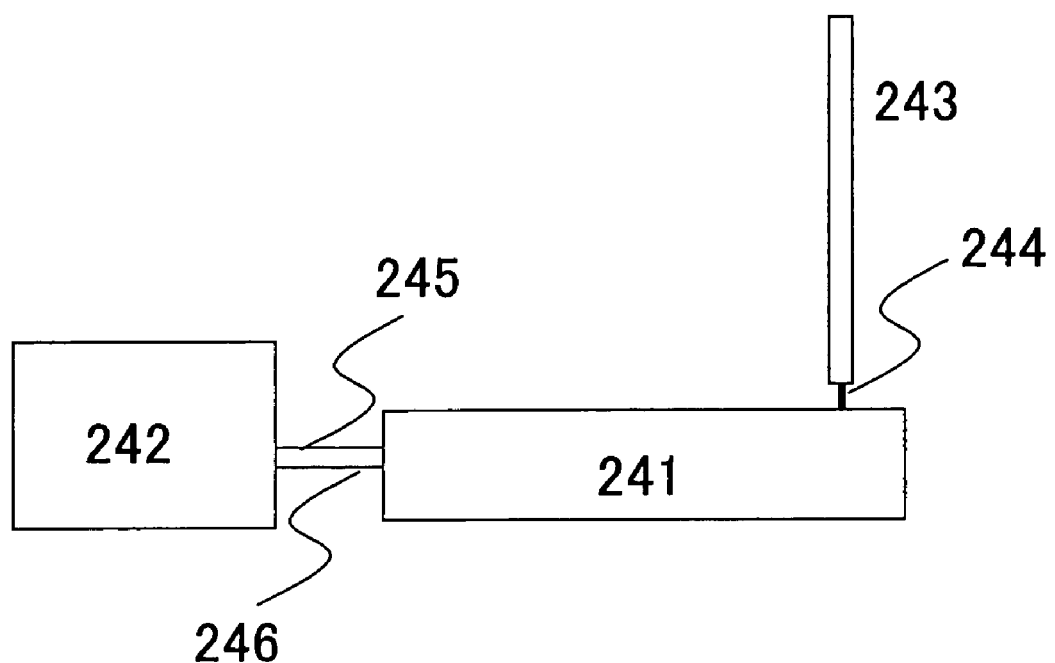
FIG. 15 illustrates a constitution of a cooling fan making use of the actuator of Example 3.

FIG. 15 illustrates the constitution of a cooling fan making use of the actuator as described based on FIG. 14A. This cooling fan is composed of an actuator 241 of a type described in FIG. 14A, an AC power supply 242 and a fan 243. The length of each of the actuator and a rod 244 is adjusted so that the rod 244 bends at 60 degree when a voltage of 1.2V is applied to the actuator 241. A fan 243 is connected to the end of the rod of the actuator 241. The transmitting electrodes 245, 246 of the actuator are linked to the AC power supply 242.

When an AC voltage signal having amplitude of 2.4V and a frequency of 2 Hz is output between the transmitting electrodes 244 and 245 from the AC power supply 242, the fan 243 bends at 60 degree in cycles of 0.5 second and starts operation. This cooling fan is characterized by that it activates at a low voltage and is noiseless.

What is claimed is:

1. A material for an actuator film which is dipped in an electrolyte solution and expands/contracts in accordance with the application of a voltage, said material being imparted with a high electron conductivity by dispersing conductive fine particles in an ion conductive polymer material having a capacity of capturing a negative or positive electrolyte ion ionized in the electrolyte solution by the application of a voltage.

2. A material for an actuator film of claim 1, wherein the ion conductive polymer material is a perfluorosulfonic acid copolymer, perfluorocarboxylic acid copolymer, polystyrenesulfonic acid copolymer or polystyrenecarboxylic acid copolymer.

3. A material for an actuator film of claim 1, wherein the conductive fine particles are micro conductors which are carbon fine particles, platinum fine particles, gold fine particles or carbon nanotube, or mixture thereof.

4. An actuator film which is dipped in an electrolyte solution together with electrodes and expands/contracts by the application of a predetermined voltage between the electrodes, said actuator film comprising a material being imparted with a high electron conductivity by dispersing conductive fine particles in an ion conductive polymer material having a capacity of capturing a negative or positive electrolyte ion ionized in the electrolyte solution by the application of a voltage.

5. An actuator film of claim 4, wherein the ion conductive polymer material is a perfluorosulfonic acid copolymer, perfluorocarboxylic acid copolymer, polystyrenesulfonic acid copolymer or polystyrenecarboxylic acid copolymer.

6. A material for an actuator film of claim 4, wherein the conductive fine particles are micro conductors which are carbon fine particles, platinum fine particles, gold fine particles or a carbon nanotube, or mixture thereof.

7. An actuator comprising an actuator film, an electrode disposed opposite to the actuator film, an electrolyte solution in which the actuator film and the electrode are to be dipped, and a voltage supply for applying a predetermined voltage between the actuator film and the counter electrode, said actuator film comprising a material being imparted with a high electron conductivity by dispersing conductive fine particles in an ion conductive polymer material having a capacity of capturing a negative or positive electrolyte ion ionized in the electrolyte solution by the application of a voltage.

8. An actuator film of claim 7, wherein the actuator film comprises the ion conductive polymer material and conductive fine particles and electric connection between the actuator film and the voltage supply for applying a predetermined voltage between the actuator film and the counter electrode is conducted only at an end portion of the actuator film.

9. An actuator film of claim 7, wherein the actuator film comprises the ion conductive polymer material and conductive fine particles and electric connection between the actuator film and the voltage supply for applying a predetermined voltage between the actuator film and the counter electrode is conducted at an end portion of the actuator film and a metal electrode disposed spirally on the surface of the actuator film.

10. An actuator of claim 7, wherein the actuator film has a structure having thin films of the ion conductive polymer material and the conductive fine particles and metal thin-film electrodes stacked alternately one after another.

11. An actuator of claim 7, wherein the actuator film comprises a plurality of unit actuator films composed of a material mixture of the ion conductive polymer material and the conductive fine particles and a flexible resin thin-film having a surface covered with a conductor; and on both surface of the conductors on both sides of the resin thin-film, the plurality of unit actuator films are disposed regularly in one row in the direction of expansion/contraction.

12. An actuator of claim 10, wherein the metal electrodes are independent and connected each other via a conductive wire.

13. An expansion/contraction type actuator of claim 10, wherein a folded but continuous metal foil constitutes the metal electrodes.

* * * * *